United States Patent Office 3,365,171
Patented Jan. 23, 1968

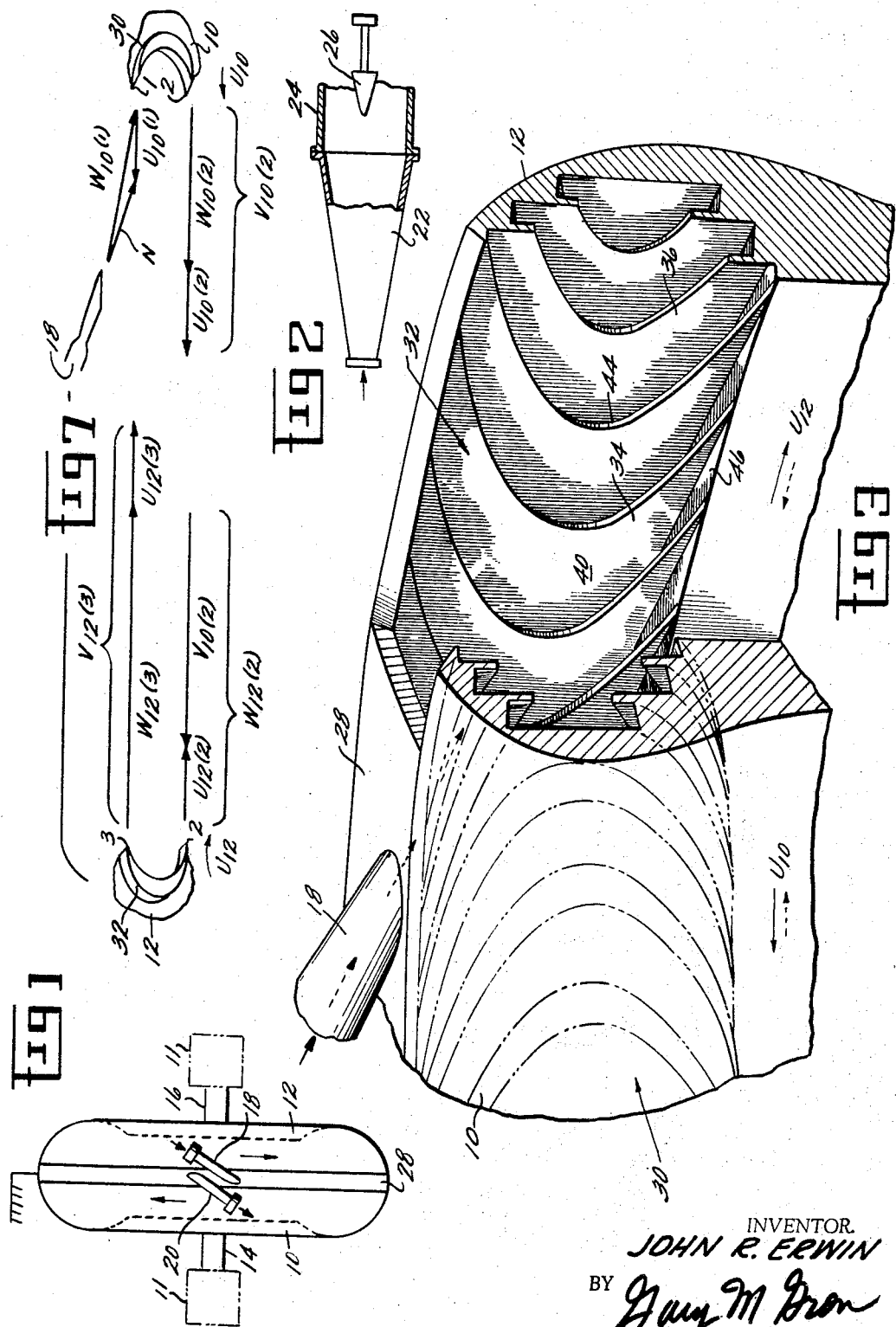

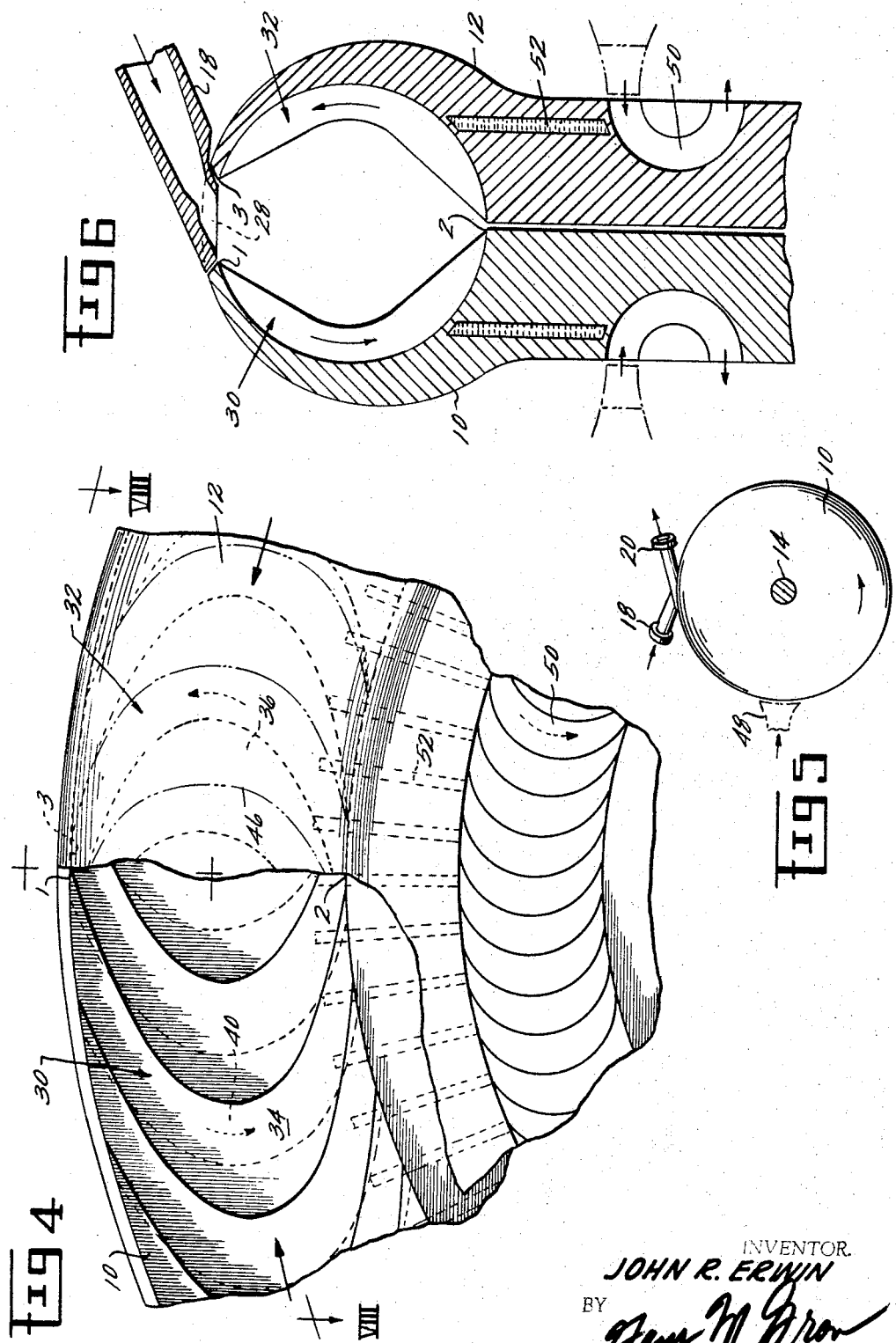

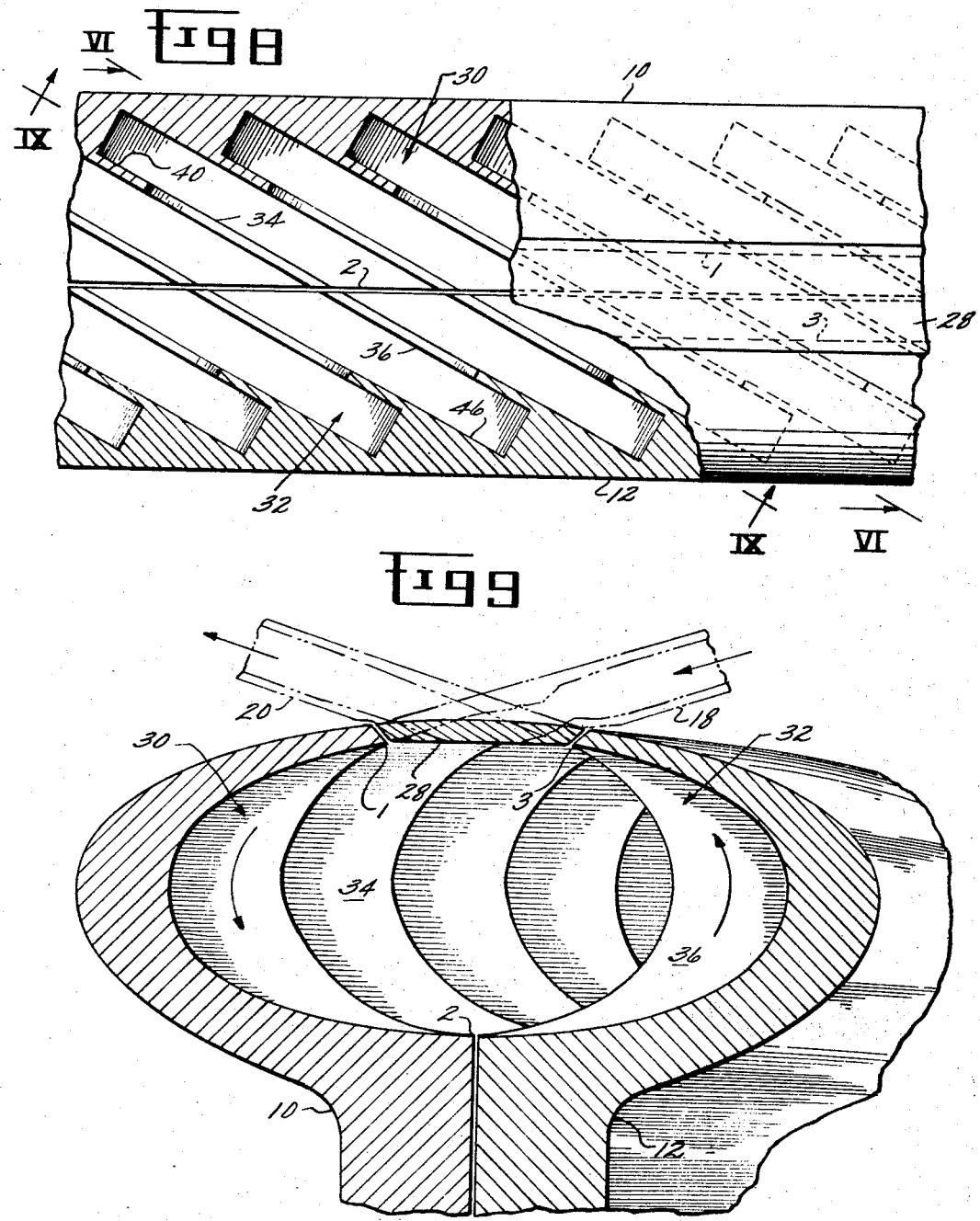

3,365,171
FLUID FLOW MACHINE
John R. Erwin, Cincinnati, Ohio, assignor to General
Electric Company, a corporation of New York
Filed June 16, 1965, Ser. No. 464,427
10 Claims. (Cl. 253—16.5)

ABSTRACT OF THE DISCLOSURE

The invention is directed primarily to a continuous flow radial mechanical accelerator for increasing fluid velocities to very high (i.e. re-entry) values for testing purposes. The particuar mechanical arrangement uses counter rotating discs and the fluid is passed from one disc to the other any number of times before it exits at high velocity. The number of passes determines the fluid velocity.

---

For simulation purposes, it is desired in many instances to accelerate air or other fluids to very high velocities. High velocities are required for testing hypersonic models or vehicles that may be subject to re-entry conditions. In order to do this outside of the actual environment it is customary to provide a wind tunnel and flow air therethrough at extremely high velocities and subject the model in the tunnel to the high velocity fluid in order to study the effects thereon. When re-entry conditions are discussed, the fluid velocity must be around Mach 25 or about 20,000 feet per second. Devices to produce these velocities are extremely complex or the velocities are very short lived.

Some shock tubes will achieve velocities in the order required but only for a very small fraction of a second. A known means for achieving high velocity fluid streams for longer running time is by the use of rotating axial flow mechanical accelerators. It is known that velocity may be added to the fluid equivalent to about twice the rotational speed of the rotor. This provides a very large energy addition to the airflow. Thus, for example, if flow is injected into the device at 2,000 feet per second and the rotor turns at 1,000 f.p.s., it is possible to double the air velocity or increase the velocity leaving the rotor stage to 4,000 f.p.s. In other words, the velocity which is added to the air by the rotor is equal to about twice the rotational speed of the rotor.

One of the problems with the prior art axial flow machine is in the manufacturing complications which are encountered in trying to reach very high velocities. Customarily, the axial flow machine may consist of a rotor with blades on it to turn the flow through a large angle of about 120° and then pass the partially accelerated flow to an adjacent axially spaced rotor which turns in the opposite direction. This may be compounded in order to build up the air velocity. Inasmuch as each rotor must rotate counter to its adjacent rotor the shafting and the bearing problems become complex so that it is difficult to have more than four axial rotors which may increase the velocity to as high as 12,000 f.p.s. Obviously, this is below the maximum velocities desired and requires complex equipment. As a modification, it is possible to use stationary blade rows between the rotors and have all the rotors turning in the same direction but the heat losses through the stationary blading become extremely large so that a point is reached in the devices using stationary blades where the heat loss through the rotor and stationary blades is equal to that put into the air by mechanical work achieved in the rotors. At this point there is no advantage in adding further stages and this point is well below the maximum velocities required. Thus, in counter rotating axial arrangements it is difficult to have more than four stages because of the shafting problem. In the device using rotating-stationary-rotating stages the heat loss problem becomes determining. The result is that such devices have about a maximum limit of around 10–12,000 f.p.s. This is far below the desired velocities for many applications.

The main object of the present invention is to provide a fluid flow machine which can continuously simulate re-entry velocities and increase the velocities up to 15–25,000 f.p.s.

A further object is to provide such a machine which utilizes radial flow as opposed to an axial flow type of mechanical accelerator.

Another object is to provide such a machine wherein additional rotors are not required for additional acceleration.

A further object is to provide a fluid flow machine which is continuous in operation and in which cooling can take place over most of the rotor to cope with the high temperature problems.

Another object is to provide such a machine which is variable in its arrangement such that there is a wide choice of increased velocity ranges available.

A further object is to provide such a machine wherein the friction and heat generated are kept at a minimum and thermal gradients resulting from heat flow through the material are avoided.

A further object is to provide a machine which, depending on the direction of rotation, may operate either as a mechanical accelerator or a turbine.

Briefly stated, there is provided a fluid flow machine which has a pair of discs mounted to face one another for concentric counter-rotation. Oppositely directed impulse compressor blades or turbine buckets, which have radial passages therethrough parallel to the disc radius, are disposed on the facing surface of each disc at the same radius so that two rows of blades face one another on the adjacent discs and are opposite to one another. A nozzle means is provided to direct fluid tangent and into the outer radius of the blades on one disc and a collecting means is peripherally spaced from the nozzle and disposed to remove the fluid tangentially from the outer radius of the blades on the other disc. Means rotatably drive the discs counter to one another. Depending on the rotation of the discs the apparatus may be either an accelerator or a turbine. The discs of an accelerator may be driven by conventional means or may be driven by additional turbine buckets in the opposite face of the discs. The blades are formed to reverse the flow substantially 180° to accelerate the fluid flowing therethrough and the collecting means may comprise an expansion nozzle that is directed into a tunnel for further increase in velocity. Further, the leading edges of the blades are swept back to form a U-outline in order to reduce the high stagnation pressures and temperatures which would otherwise occur. The discs may be cooled in the arc of rotation between the nozzle means and the collecting means not occupied by the fluid being accelerated. The driving turbine on the side of the discs may be a refrigeration turbine.

While the specification concludes with claims particularly pointing out and distinctly claiming the subject matter which is regarded as the invention, it is believed the invention will be better understood from the following description taken in connection with the accompanying drawings, in which:

FIGURE 1 is a schematic elevation view of a typical radial flow accelerator of the invention;

FIGURE 2 is a diagrammatic showing of a wind tunnel into which the flow accelerator of FIGURE 1 may discharge;

FIGURE 3 is a partially cut away perspective view of a radial flow accelerator embodying the present invention;

FIGURE 4 is a partial cross-sectional view of the radial flow accelerator of FIGURE 3;

FIGURE 5 is a simplified side view of the radial flow accelerator which illustrates a cooling means for the device;

FIGURE 6 is a view taken on line VI—VI of FIGURE 8;

FIGURE 7 is a vector diagram illustrating velocities obtainable by this device;

FIGURE 8 is a view taken on line VIII—VIII of FIGURE 4; and

FIGURE 9 is a view taken on line IX—IX of FIGURE 8.

In order to avoid limitations of the axial type of mechanical accelerator and provide a device which has substantially unlimited ability to increase the velocity of a fluid such as air, there is provided a pair of discs or rotor wheels 10 and 12 as shown in FIGURE 1. These discs may be driven in any suitable manner by means 11 and, as shown, are mounted adjacent to one another to rotate concentrically on shafts 14 and 16 respectively. It is important that the discs 10 and 12 are counter-rotating with respect to one another as shown by the arrows for the example discussed herein. The direction which each disc rotates determines whether the device is used as an accelerator or as a turbine and the placement of the nozzle and the collecting means is proper as will be explained. For convenience, the accelerator example will be described hereinafter although "blades" may be considered as "buckets" in the usual manner.

It will be appreciated that the velocities of the air involved herein are highly supersonic and are to be increased to very high supersonic or hypersonic velocities. The supersonic air is directed into the disc 10 by means of an expansion nozzle 18 and is later collected from disc 12 by a collecting means 20 which may also be an expansion nozzle to give the exit air an additional acceleration supersonically. Referring to FIGURE 2, the device of FIGURE 1 may then exhaust into an expansion nozzle 22 or nozzle 20 may be actually located in place of nozzle 22 which, in turn, is directed into tube member 24 for exhaust at very high supersonic velocities. As is customary, model 26 may be suspended within member 24 for the actual testing. The spent air may be exhausted in any suitable manner or may be returned to the accelerator in the manner of a usual closed circuit wind tunnel.

In order that the incoming air may be accelerated to very high velocities, reference is made to FIGURE 3 to illustrate compressor operation of the invention. In this figure, it will be seen that disc 10 is provided with a first row of impulse blades or passageways generally indicated at 30 and that disc 10 rotates in the direction of the solid arrow. The individual blades 30 that are formed in the surface of disc 10 are substantially U-shaped as shown and comprise a row completely around the peripheral edge of disc 10. Still referring to FIGURE 3, mounted adjacent to disc 10 is a similar disc 12 (see FIGURE 1), which is provided with a similar second row of identical impulse blades generally indicated at 32. At this point, it should be noted that the blades 30 and 32 are identical in all respects but are merely oppositely facing one another and rotate in opposite directions as will be apparent. Consequently, it will be necessary to describe only a single blade as seen in FIGURES 3 and 4.

As particularly shown in FIGURE 8, the individual blade includes radial side walls 34 and 36 which are highly desired. Because of the high rotational speeds, it is desired that the blades be formed with metal in the radial direction. The radial side walls 34 and 36 thus tend to parallel the disc radius and provide metal in the direction to act against centrifugal forces and provide very strong blades. These are unique in that the elements of their surfaces are radial which are desired from the strength standpoint. Additionally, it will be seen that the flow passages 40 through the blades are substantially radial in direction. In other words, the air is turned substantially 180° within each impulse blade while remaining in essentially radial planes. The blades on the adjacent disc are similarly formed at the same radius so that the blades are provided on the facing surface of each of the discs and are formed so that they reverse the flow substantially 180°.

It is known that the air injected against the direction of rotation may have its velocity increased by about two times the rotational speed of the rotor. With the discs rotating in opposite directions air is supplied which is going to be accelerated to very high velocities. To this end, there is provided nozzle 18, which is preferably an expansion nozzle as previously noted, and which is mounted in stationary member 28. The nozzle is so placed as to direct its air tangentially into the outer radius of the blades 30 in the row of blades on disc 10 as seen in FIGURES 3, 6 and 9. By directing the flow tangentially into the blades, i.e., the relative velocity of the air into the disc, the air does not strike any flat surfaces but rather, as seen in FIGURES 6 and 9, it is directed in a straight line into the curved surface of the outer radius of the blade 30 and immediately starts turning and accelerating. The air continues around the blade turning approximately 180° and then exits tangentially from the inner radius of the same blade. At this point, the adjacent row of blades 32 at the same radius in disc 12 rotating oppositely encounters the flow coming off the inner radius of blade 30. This flow enters blades 32 at the inner radius tangentially where it is similarly reversed substantially 180° to exit into collecting means 20 which is spaced peripherally around the disc from nozzle 18. Thus, the incoming fluid, such as air, has made a complete 360° turn and is drawn off at collecting means 20 at a velocity increased by approximately four times the rotor speed when the rotors turn at the same speed.

Reference to FIGURE 7 and the vector diagram will explain this velocity obtainable at collector 20.

If the direction and velocity of the air exiting from nozzle 18 is shown as N and the wheel speed of disc 10 as $U_{10}$ then, by ordinary compressor technology, it will be apparent that the absolute velocity of the air with respect to the disc 10 is shown as $W_{10}$. In other words, this is the velocity that rotor blade 30 sees the air entering. It is this velocity that is directed at the outer radius at point 1 tangent to blade 30 in FIGURES 4, 6 and 9. The air progresses around the blade 30 for substantially 180° and then exits at the inner radius as shown in FIGURES 4 and 6 at point 2. Thus, its velocity relative to rotor disc 10 at point 2 is equivalent to velocity $W_{10}$. In order to determine the absolute velocity of the air at point 2 it is necessary to add to that velocity the rotational speed $U_{10}$ of the disc at point 2 and this is shown as $U_{10(2)}$. Thus, the absolute velocity $V_{10(2)}$ of the air at point 2 is equal to the vector sum of $W_{10}$ plus $U_{10(2)}$. This air velocity is then directed tangentially at 2 into the inner radius of the blade 32 in disc 12 as the disc 12 comes around in the opposite direction. In order to find the air velocity relative to disc 12 at point 2 it is necessary to add the rotational speed $U_{12}$ of the disc at this point 2 and this is shown as $U_{12(2)}$. It will be apparent that the initial velocity represented by N has now increased to $W_{10}$ plus $U_{10(2)}$ plus $U_{12(2)}$ and that this relative velocity $W_{12(2)}$ at point 2 is directed tangentially into blades 32 at the inner radius thereof at 2. This relative velocity $W_{12(2)}$ is already substantially four times the original value N if, as shown for easy illustration, the original air velocity N and wheel speeds U are made equal. The air then continues around blade 32 for another 180° and exits at point 3. In order to find the final total velocity relative to a stationary point or in stationary coordinates, it will be apparent that this final velocity is the sum of the velocity $W_{12(2)}$ at point 2 in the vector diagram just described to which the speed of disc 12, at the outer radius 3 is added as $U_{12(3)}$. This final vector $V_{12(3)}$ then represents the total absolute velocity that is obtainable by one 360° turn in the counter-rotating discs of the device disclosed. It will be apparent that this final velocity $V_{12(3)}$ is equal to the original injection velocity N plus approximately four times the wheel speed U. In other words, if the original injection velocity N were 1,500 f.p.s. and the rotational speed 1,500 f.p.s. the exit velocity would be around 7,500 f.p.s. It will be apparent immediately that passing again through a complete loop of adjacent blades will increase the velocity by four times the wheel rotational speed In other words, if the velocity exiting at point 3 is again fed into blades 30 at the outer tangent it follows the same path with larger vectors. Consequently, suitable passes may be made to increase the velocity to the level desired. At some suitable selected point, since this is a variable arrangement, the collecting means 20 may be peripherally spaced about the disc as shown in FIGURE 5 to remove the very high velocity air.

With the increase in velocity also goes an increase in temperature to vary high values. In order to avoid the stagnation temperatures on the leading edge of the blades, the blades are formed with a U-shape outline (shown in FIGURE 9) so that their leading edges 44 are swept to the flow so that the effect of total temperature with the leading edge is greatly reduced to minimize the cooling problems. Being swept as shown, they do not have high stagnation temperatures and therefore are not subjected to the high leading edge heat transfer of the conventional type of accelerators. It is to be noted also that the use of discs 10 and 12 adjacently mounted as shown, minimize any sealing problems inasmuch as the pressure, whether by the cooling medium or the fluid being accelerated, exists all the way around periphery of the adjacent discs so that there is no place for any leakage to occur. In other words, leakage cannot, in FIGURE 6, run down through the clearance space between the discs since the pressure at the opposite end is the same. It is also important to note that the radial passages 40 are bounded only on one side. The pressure surface 46 which is a smooth flat curved surface has no opposite suction surface. The suction surface is non-existent. Because of the extremely high velocities the pressure over the suction surface if used would be very close to an absolute vacuum and therefore it is possible to eliminate it completely. That is to say, that the surface that would normally be spaced slightly from surface 46 to form the suction surface of an airfoil is simply absent.

Another feature of this invention is the fact that metal heating is greatly minimized. It will be apparent, from reference to FIGURE 5, that the nozzle 18 and collecting means 20 may be spaced any suitable predetermined peripheral distance from one another around an arc of the disc depending on how many circuits the air is to make through the blades and the velocity desired. The remainder of the arc of rotation of the discs from collector to nozzle may be subject to a cooling means 48 diagrammatically shown to inject cooling air similar to nozzle 18 and which cools by external means a large portion of the discs and blades during the rotation. Significantly, no thermal stresses are created because it will be apparent from FIGURE 4 that the same surfaces of the blades are heated and cooled. In other words, the heat does not pass through any metal and heat that is generated along surface 46 is immediately cooled along the same surface after the disc and blade has passed out of the arc which is handling the high velocity air and developing high temperatures. A fly wheel effect may be obtained to store energy for short periods by making discs 10 and 12 of suitable weight.

The discs may, as previously stated, be rotated by any suitable means and a typical arrangement may be the provision of a turbine means 50 formed in the oppositely or non-facing surfaces of the discs. Additionally, a thermal syphon means 52 may be used to conduct heat from the blades 30 and 32 to the turbine 50 which may act as a refrigeration turbine. This internal type cooling is conventional but is a means which may be used with the combination herein to cool the disc metal in conjunction with or in place of cooling means 48 which as noted above, is external of the discs and is directed against the disc blades.

While the device has been shown as applied to a fluid flow machine of the mechanical accelerator type it will be apparent that it can also operate as a turbine by rotating in the opposite direction and making blades 30 and 32 impulse buckets. Operating as a turbine, it will extract a very large amount of energy from the incoming fluid and will exhaust low velocity cool fluid. In such an arrangement, it is merely necessary to reverse the direction of rotation of the discs as shown in FIGURE 3 to those shown by the dotted arrow. In this manner then, the incoming fluid from nozzle 18 is directed into buckets 30 which are rotating with the direction of the incoming fluid rather than opposed to it as in the accelerator case.

Thus, the fluid flow machine of the invention provides for a wide variation of continuous velocities obtainable by merely locating the collecting means at the peripheral distance desired. The wind tunnel thus receives a continuous flow. Additionally, the cooling problems are minimized and a very large arc may be provided for cooling air externally or internally of the disc. The blades are formed such that there is substantially radial flow across the discs and the tangential entrance and exit in conjunction with the swept-back feature provides for acceleration to a very high velocity and minimum temperature rise for simplified cooling.

While there have been described preferred forms of the invention, obvious equivalent variations are possible in light of the above teachings. It is therefore to be understood that within the scope of the appended claims, the invention may be practiced otherwise than as specifically described, and the claims are intended to cover such equivalent variations.

I claim:
1. A fluid flow machine comprising,
first and second discs mounted facing one another for concentric counter rotation,
a plurality of passageway means circumferentially disposed on each of said discs for receiving fluid from a first direction and discharging fluid from said passageway means in an opposite direction,
said passageway means on opposite discs being positioned so that fluid is discharged from the passageway means on said first disc into the passageway means on the second disc,
means for directing a fluid stream into the passageway means on said first disc,
means for receiving said fluid stream from the passageway means in the second disc,
whereby the velocity of the fluid stream is substantially changed.
2. Apparatus as in claim 1 wherein,
each of said passageway means comprise,
a pair of generally radially extending side walls and a curved end wall extending between said side walls,
said side walls being positioned to form a relatively small angle with the plane of rotation of said first and second discs.
3. Apparatus as in claim 2 wherein,
said fluid stream directing means is adapted to direct said stream into said passageway means against the rotation of said first disc,
and said apparatus further comprises means for driving said first and second discs,
whereby the velocity of said fluid stream is substantially increased.
4. Apparatus as in claim 3 wherein the velocity of said fluid stream directed into the first disc passageway means has a supersonic velocity and wherein,
said directing means comprises an inlet expansion nozzle means for accelerating fluid, and said receiving means comprises an outlet expansion nozzle means for further accelerating said fluid stream.

5. Apparatus as in claim 4 wherein,
said plurality of passageway means are positioned closely adjacent one another so that adjacent side walls form generally radially extending blades,
the edge of said radially extending blades being swept in a U-shape for minimizing shock losses in said fluid stream.

6. Apparatus as in claim 5 wherein,
said inlet nozzle means is positioned to discharge said fluid stream in the radially outward portion of the passageway means on said first disc,
said outlet nozzle means is positioned to receive said fluid stream from the radially outward portion of the passageway means in said second disc,
said inlet and outlet nozzle means being peripherally spaced from one another a given distance whereby the velocity of said fluid is increased a predetermined amount.

7. Apparatus as in claim 6 wherein said means for driving said first and second discs comprises,
turbine blade means formed in the non-facing surface of said discs,
means for directing a fluid stream against said turbine blade means whereby said discs are rotated.

8. Apparatus as described in claim 7 further comprising,
means for cooling said discs and passageway means in the arc of rotation from said inlet to said outlet nozzle means.

9. Apparatus as in claim 8 wherein,
said cooling means is disposed in said discs.

10. Apparatus as described in claim 9 wherein,
said cooling means is external of said discs and blades and directed thereagainst.

References Cited

UNITED STATES PATENTS

| | | | |
|---|---|---|---|
| 2,411,552 | 11/1946 | New | 60—49 |
| 3,044,685 | 7/1962 | Lapiken | 253—16.5 X |

FOREIGN PATENTS

| | | |
|---|---|---|
| 709,440 | 8/1941 | Germany. |
| 772,688 | 4/1957 | Great Britain. |

EVERETTE A. POWELL, JR., *Primary Examiner.*